United States Patent
Djukic et al.

(10) Patent No.: US 9,560,674 B2
(45) Date of Patent: Jan. 31, 2017

(54) VIRTUAL BUSY-TONE FOR FULL-DUPLEX WIRELESS NETWORKS

(71) Applicant: Huawei Technologies Co., Ltd., Shenzhen (CN)

(72) Inventors: Petar Djukic, Ottawa (CA); Sheng Sun, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 14/492,886

(22) Filed: Sep. 22, 2014

(65) Prior Publication Data
US 2016/0088657 A1    Mar. 24, 2016

(51) Int. Cl.
*H04W 74/08* (2009.01)
*H04L 5/14* (2006.01)
*H04L 1/00* (2006.01)

(52) U.S. Cl.
CPC ............ *H04W 74/0816* (2013.01); *H04L 1/00* (2013.01); *H04L 5/14* (2013.01)

(58) Field of Classification Search
CPC .. H04W 84/12; H04W 72/082; H04W 72/042; H04W 24/02; H04W 88/08; H04W 52/243; H04W 72/0446; H04W 72/0406; H04W 74/0808
See application file for complete search history.

(56) References Cited

U.S. PATENT DOCUMENTS

| | | | | |
|---|---|---|---|---|
| 2003/0207699 A1* | 11/2003 | Shpak | ................... | H04W 48/20 455/525 |
| 2006/0045059 A1* | 3/2006 | Yun | ..................... | H04W 74/002 370/338 |
| 2007/0274280 A1 | 11/2007 | Haas et al. | | |
| 2011/0044298 A1* | 2/2011 | Wentink | ................ | H04L 1/1621 370/336 |
| 2012/0127937 A1* | 5/2012 | Singh | ................ | H04W 74/0816 370/329 |

FOREIGN PATENT DOCUMENTS

| | | |
|---|---|---|
| CN | 1898920 A | 1/2007 |
| CN | 102625367 A | 8/2012 |
| WO | 0022866 A1 | 4/2000 |

\* cited by examiner

*Primary Examiner* — Curtis A Alia
(74) *Attorney, Agent, or Firm* — Slater Matsil, LLP

(57) ABSTRACT

System and method embodiments are provided for a virtual busy-tone for full-duplex wireless networks. Embodiments provide a mechanism for efficiently eliminating the hidden node problem. In an embodiment, a method in a full-duplex enabled wireless network component for avoiding collisions includes receiving, at the network component, a data transmission from a first station; and transmitting a busy indicator from the network component, the busy indicator including a time duration determined in accordance with an expected time duration of the data transmission to instruct any non-transmitting station to not transmit data during the included time duration.

38 Claims, 8 Drawing Sheets

VIRTUAL BUSY-TONE FOR FULL-DUPLEX WIRELESS NETWORKS

TECHNICAL FIELD

The present invention relates to a system and method for wireless communication systems, and, in particular embodiments, to a system and method for full-duplex operation of a wireless communication system.

BACKGROUND

Full-duplex operation is a promising manner in which to increase throughput of wireless systems. For example, in the media access control (MAC) layer, the full-duplex operation can be used to increase the efficiency of random access. A wireless access point (AP) utilizing full-duplex mode may communicate with several wireless devices. If two or more devices transmit data to the AP at the same time on the same channel, the data from both wireless devices is undecipherable by the AP. In this situation, neither wireless device is successful in its data transmission. To avoid this scenarios, may wireless systems utilize carrier sense multiple access (CSMA) collision avoidance (CA) in which the various wireless devices use carrier sensing to avoid collisions by transmitting only when the channel is sensed to be "idle." However, even using CSMA/CA, collisions sometimes occur due to the hidden node problem.

FIG. 1 is a block diagram of a wireless network 100 illustrating the hidden node problem. Wireless network 100 includes an $AP_1$ 104, a first wireless station ($STA_1$) 102 and a second $STA_2$ 106. $STA_1$ 102 is a hidden node from $STA_2$ 106. $AP_1$ 104 can detect transmissions from $STA_1$ 102 and $STA_2$ 106, but $STA_2$ 106 cannot detect transmissions from $STA_1$ 102. In other words, $STA_2$ 106 is in the range of $AP_1$ 104, but is out of range of $STA_1$ 102. Since $STA_2$ 106 cannot detect the transmission from $STA_1$ 102, $STA_2$ 106 may transmit at the same time as $STA_1$ 102. When this happens, $AP_1$ 104 is unable to decipher the data sent by either $STA_1$ 102 or $STA_2$ 106. Thus, hidden nodes cause CSMA efficiency (i.e., approximately 90% channel efficiency) to deteriorate to the ALOHA efficiency (i.e., approximately 18% channel efficiency).

One existing solution to the hidden node problem is request-to-send (RTS), clear to send (CTS). FIG. 2 is a block diagram of a wireless network 200 illustrating an RTS-CTS solution to the hidden node problem. Wireless network 200 includes an $AP_1$ 204, a first $STA_1$ 202, and a second $STA_2$ 206 similar to network 100. To solve the hidden node problem, $STA_1$ 202 transmits an $RTS_1$ to the $AP_1$ 204. The $AP_1$ 204 then transmits a $CTS_1$ which the $STA_2$ 206 overhears. The $STA_2$ 206 sets-up a "virtual carrier sensing" timer to disable its transmission during the transmission from the $STA_1$ 202 to the $AP_1$ 204. However, although the RTS-CTS mechanism solves the hidden node problem, it is inefficient due to its overhead. Furthermore, if full-duplex is implemented over the entire bandwidth (with a single channel), CSMA does not work since a station overhearing the signal has no idea if it is from the AP or another STA.

SUMMARY

In accordance with an embodiment, a method in a full-duplex enabled wireless network component for avoiding collisions includes receiving, at the network component, a data transmission from a first station; and transmitting, by the network component, a busy indicator from the network component, the busy indicator including a time duration determined in accordance with an expected time duration of the data transmission to instruct any non-transmitting station to not transmit data during the included time duration.

In accordance with an embodiment, a network component configured for full-duplex wireless operation for avoiding collisions includes a processor and a computer readable storage medium storing programming for execution by the processor, the programming including instructions to cause the network component to: receive a data transmission from a first station; and transmit a busy indicator from the network component, the busy indicator including a time duration determined in accordance with an expected time duration of the data transmission to instruct any non-transmitting station to not transmit data during the included time duration.

In accordance with an embodiment, a method in a wireless network component for suspending transmissions to avoid collisions includes receiving, by the network component, a busy indicator from a first wireless device, wherein the busy indicator comprises a time duration; determining, by the network component, a time duration according to the busy indicator; and suspending, by the network component, transmissions to the first wireless device until an expiration of the time duration.

In accordance with an embodiment, a network component for suspending transmissions to avoid collisions includes a processor and a computer readable storage medium storing programming for execution by the processor, the programming including instructions to: receive a busy indicator from a first wireless device, wherein the busy indicator comprises a time duration; determine a time duration according to the busy indicator; and suspend transmissions to the first wireless device until an expiration of the time duration.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for efficiently eliminating the hidden node problem in full-duplex wireless systems with random access. In an embodiment, a full-duplex network component transmits a busy indicator to wireless stations in its coverage area after beginning receipt of data from a station. The busy indicator notifies the other stations to suspend their back-off operations or procedures for a time duration specified in the busy indicator. In some embodiments, the time duration includes an expected time duration plus a supplemental time duration to account for such things as an acknowledgement message. The time duration may include only the time for the ongoing data transmission to be complete or may include additional time for other tasks, such as, for example, transmitting an acknowledgement (ACK) message. During this time no other station will attempt to transmit data to the full-duplex network component. Thus, no two stations are transmitting at the same time even if the stations are out of range of other stations that communicate with the full-duplex network component. There is no CTS-RTS exchange, which means better efficiency. In various embodiments, the busy indicator is a busy signal or a busy frame. Some embodiments described herein refer to either busy signal or busy frame. However, it should be noted that other busy indicators may be substituted for the busy signal or busy frame. In some embodiments, transmitting a busy indicator is or includes broadcasting the busy indicator. In some embodiments, the busy indicator includes a physical layer signal. In an embodiment, the physical layer signal includes a low power pseudo-noise (PN) code. In an embodiment, the busy indicator including a time duration determined in accordance with an expected time duration of the data transmission to instruct any non-transmitting station to not transmit data during the included time duration. In an embodiment, the busy indicator includes at least one of a current Modulation and Coding Scheme (MCS) level, a precoder, a noise level, an interference level, and a probability of frame decoding for the first wireless device.

Figure 1:
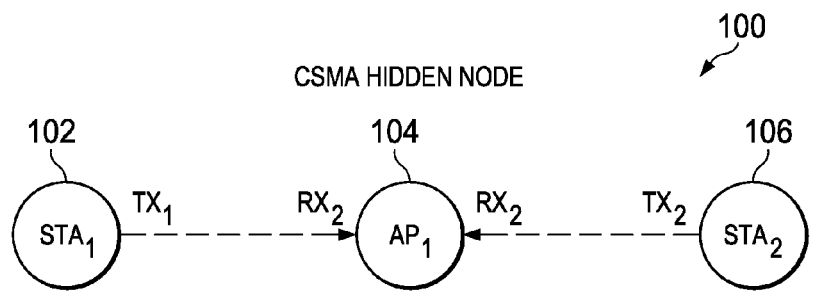
FIG. 1 is a block diagram of a wireless network illustrating the hidden node problem.
Figure 2:
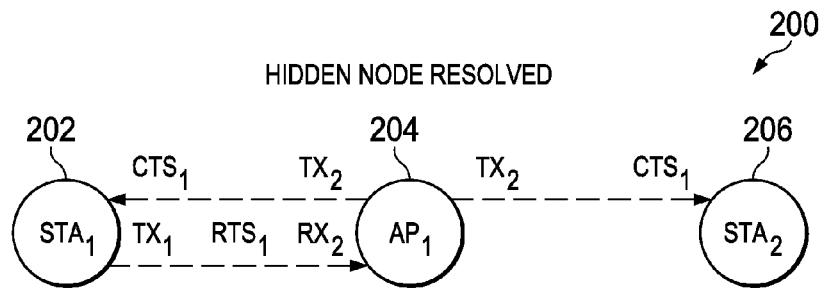
FIG. 2 is a block diagram of a wireless network illustrating an RTS-CTS solution to the hidden node problem.
Figure 3:
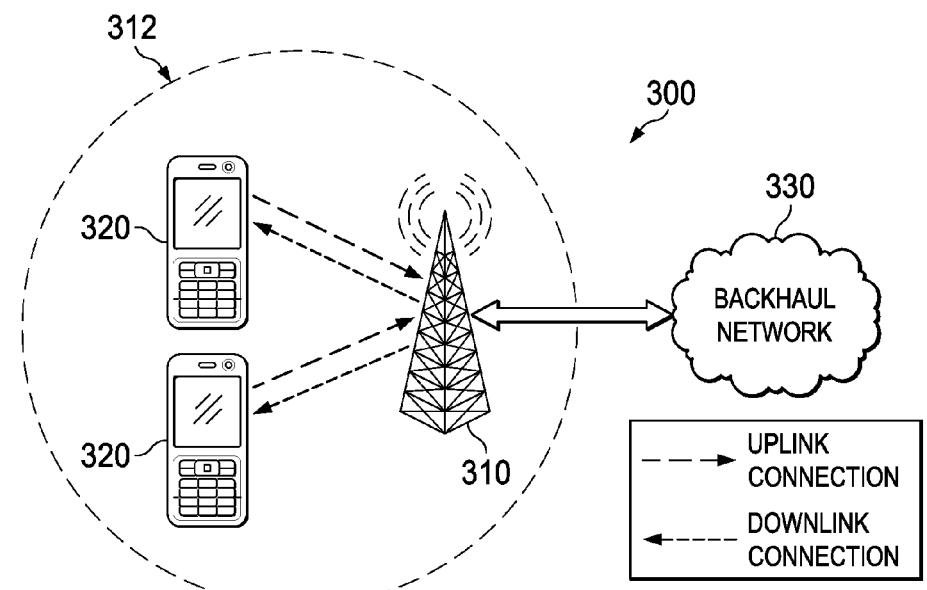
FIG. 3 illustrates an embodiment network for communicating data.

FIG. 3 illustrates an embodiment network 300 for communicating data. The network 300 comprises an access point (AP) 310 having a coverage area 312, a plurality of user equipment (UEs) 320, and a backhaul network 330. As used herein, the term AP may also be referred to as a transmission point (TP) and the two terms may be used interchangeably throughout this disclosure. As used herein the UEs 320 and the AP 310 may also be referred to as stations (STAs). The AP 310 may comprise any component capable of providing wireless access by, inter alia, establishing uplink (dashed line) and/or downlink (dotted line) connections with the UEs 320, such as a base station transceiver (BST), an enhanced base station (eNB), a femtocell, and other wirelessly enabled devices. The UEs 320 may comprise any component capable of establishing a wireless connection with the AP 310.

Examples of UEs 320 include mobile phones, smart phones, laptop computers, and tablet computers. The backhaul network 330 may be any component or collection of components that allow data to be exchanged between the AP 310 and a remote end (not shown). In some embodiments, the network 300 may comprise various other wireless devices, such as relays, femtocells, etc.

The AP 310 is configured to operate in full-duplex mode. In an embodiment, one or more of the UEs is configured to operate in full-duplex mode. In an embodiment, communications between the UEs 320 and the AP 310 is accomplished according to MAC layer protocols. In an embodiment, the AP 310 and the UEs 320 may be Institute of Electrical and Electronics Engineers (IEEE) 802.11 compliant devices.

In an embodiment, the AP 310 is configured to transmit a busy indicator, such as, for example, a busy signal or busy frame, after beginning receipt of data from a UE 320. The other UEs 320 receive the busy signal or frame and suspend their back-off operations or procedures for a duration specified in the busy signal or frame. During this time, the other UEs 320 do not transmit data to the AP 310, thereby not interfering with the ongoing transmission from the UE 320 currently engaged in an ongoing data transmission. Thus, even if the UE 320 currently transmitting data is out of range of other UEs 320 that may potentially communicate with the AP 310 and whose transmission would interfere with the AP 310 receiving the data from the UE 320 currently transmitting data, these UEs 320 are notified of the ongoing data transmission and refrain from transmitting during the time period specified by the busy signal. In an embodiment, the time period or duration specified in the busy signal or frame is the time that it will take for the AP 310 to finish receiving the ongoing transmission. In an embodiment, the time period may include an additional time for the AP 310 to transmit an ACK message to the UE 310 after the conclusion of the data transmission.

Figure 4:
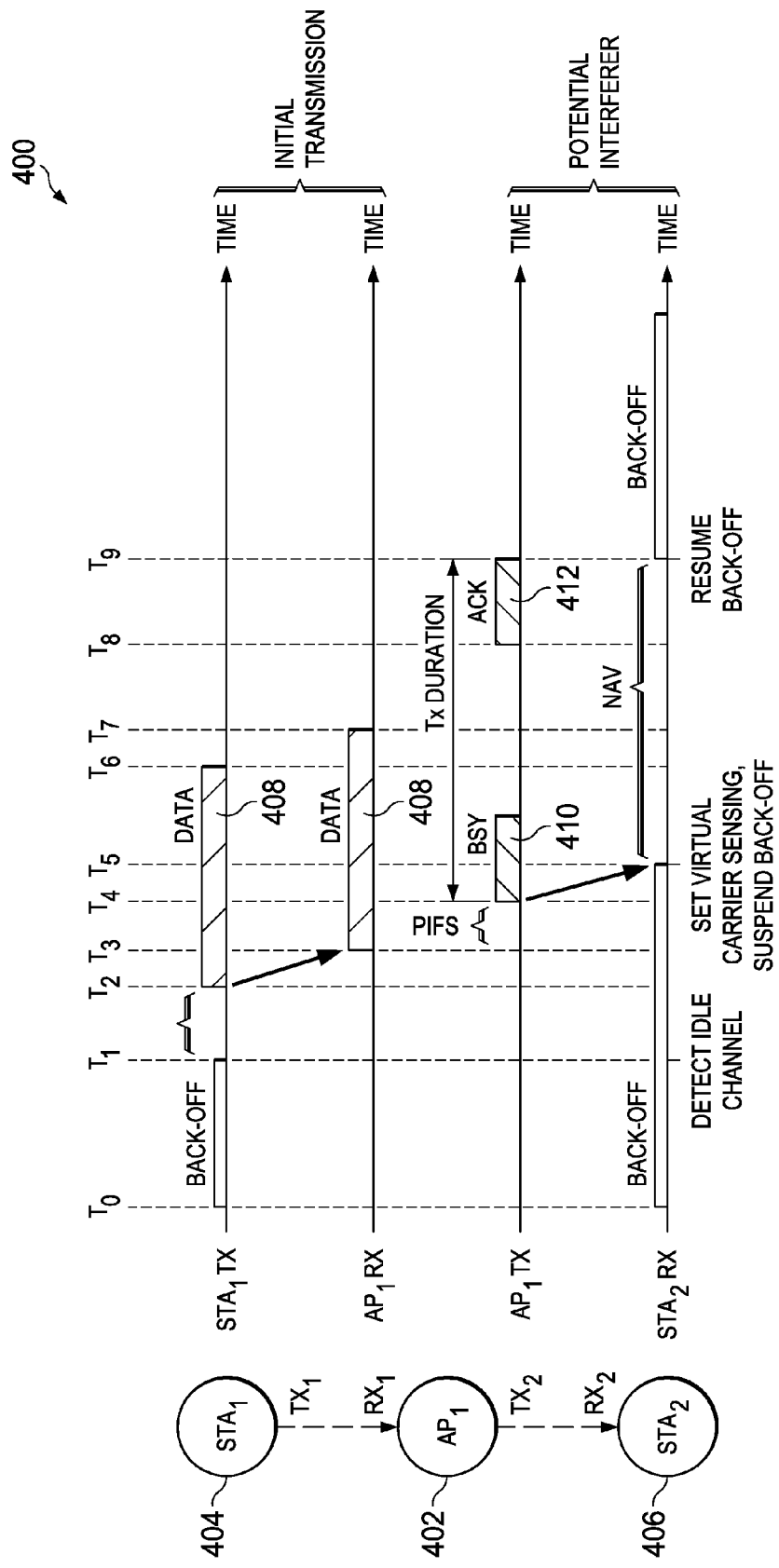
FIG. 4 is a block diagram illustrating an embodiment wireless system for a virtual busy tone to eliminate the hidden node problem.

FIG. 4 is a block diagram illustrating an embodiment of wireless system 400 for a virtual busy tone to eliminate the hidden node problem. System 400 includes an $AP_1$ 402, $STA_1$ 404, and $STA_2$ 406. $STA_1$ 404 may be a hidden node from $STA_2$ 406. At time $T_0$, both $STA_1$ 404 and $STA_2$ 406 are in back-off mode. At time $T_1$, $STA_1$ 404 detects an idle channel. At time $T_2$, $STA_1$ 404 begins transmitting data 408 to the $AP_1$ 402. At time $T_3$, the $AP_1$ 402 begins receiving the data 408 from the $STA_1$ 404. At time $T_4$, after a time period PIFS from when the $AP_1$ 402 begins receiving the data 408 from the $STA_1$ 404, the $AP_1$ 402 begins transmitting a virtual busy-tone (BSY) frame to other stations, including $STA_2$ 406. The $AP_1$ 402 transmits the BSY frame while still receiving data 408 from the $STA_1$ 404. The BSY frame includes transmission (Tx) duration information. At time $T_5$, the $STA_2$ 406 receives the BSY frame from the $AP_1$ 402 and sets its virtual carrier sensing (NAV) until the end of the $STA_1$ 404 transmission duration. The $STA_1$ 404 finishes transmitting the data 408 at time $T_6$ and the $AP_1$ 402 finishes receiving the data 408 at time $T_7$. At time $T_8$, the $AP_1$ 402 begins transmitting an acknowledgement (ACK) message to the $STA_1$ 404. At time $T_9$, the Tx duration ends and the $STA_2$ 406 resumes back-off operation. During the Tx duration, the $STA_2$ 406 does not attempt to transmit, thereby not interfering with the transmission from $STA_1$ 404. The virtual busy tone solves the hidden node problem more efficiently than the RTS-CTS procedure since the $STA_1$ 404 does not have to transmit an RTS message and then wait for a CTS message from the $AP_1$ 402 before transmitting.

In an embodiment, the full-duplex operation need not be on the same frequency. For example, in the case of Orthogonal Frequency-Division Multiple Access (OFDMA), the full-duplex operation may be two separate parts of the band using two receiver/transmitter hardware chains.

In other embodiments, the calculation of the Tx duration may be different and may not include the time for the $AP_1$ 402 to transmit an ACK message and/or may include the time for other procedures to be executed. In an embodiment, the Tx duration may only include sufficient time for the $AP_1$ 402 to finish receiving the data frame 408 from the $STA_1$ 404.

In an embodiment, the $AP_1$ 402 may transmit a channel free (or channel available) indicator (e.g., a signal or frame) at the expiration of the Tx duration to indicate that the channel is free and available for use. In other embodiments, the ACK message may be understood by each STA in the system 400 that the channel is free or open and available for use. In still other embodiments, the expiration of the Tx duration is sufficient to indicate that the channel is available in the absence of receiving another BSY frame. This last embodiment may make the most efficient use of channel resources.

In an embodiment, the $STA_2$ 406 may ignore the BSY frame. For example, if the secondary transmitter (e.g., $STA_2$ 406) determines that its transmission will not deteriorate the primary transmission from $STA_1$ 404 to $AP_1$ 402 by too much, the $STA_2$ 406 may still be able to transmit to another $AP_2$ (not shown) to which $STA_2$ 406 may also communicate without causing the transmission from $STA_1$ 404 to $AP_1$ 402 to fail. In an embodiment, to maintain fairness, the secondary transmitter (e.g., $STA_2$ 406) maintains a separate back-off for each potential primary transmitter (e.g., $AP_1$ 402).

In an embodiment, the BSY frame is a control frame. The BSY frame includes information similar to an RTS frame. The BSY frame may include the sender MAC address, the receiver MAC address, and the duration of the transmission. The time duration may or may not include the ACK transmission time.

In an embodiment, the BSY frame is a control frame or signal, and the data and the control signal may be sent in the same frame.

In an embodiment, the BSY frame is included as a part of beacon messages. The frequency of beacon transmissions may be directly related to the efficacy of the protocol. In this embodiment, multiple frames may be transmitted in case the $STA_2$ 406 misses the first transmission of the BSY frame.

In an embodiment, the BSY frame may be implemented as a physical (PHY) layer signal. The signal may be a low power pseudo-noise (PN) code, which may not interfere with other transmissions and may prevent the exposed node problem. The exposed node problem occurs when a node is prevented from sending packets to other nodes due to a neighboring transmitter. For example, if two nodes are in range of each other, but are transmitting to different receivers that are out of range of each other and out of range of one of the nodes, one node may sense the other node transmitting data via carrier sensing and therefore, refrain from transmitting its data to its receiver. However, because the two receivers are out of range of each other and are out of range of the other node transmitting data, the second node could transmit data to its receiver without negatively impacting the transmission of data from the first node to its receiver.

In an embodiment, if the transmission is fragmented, multiple BSY signals or frames may be sent as fragments arrive.

In an embodiment, the BSY frame is transmitted on the same channel as the ongoing transmission or on a different carrier frequency of the logical channel, e.g., different OFDM sub-band from current transmission.

The Tx duration can be obtained from the data transmission. In an embodiment, the Tx duration is obtained from the Modulation and Coding Scheme (MCS) selection and frame length. In an embodiment, the Tx duration is obtained from the duration field in the frame. The Tx duration may be to the end of the frame or to the end of the ACK of the frame.

In an embodiment, the BSY frame contains information on the identity of the current transmitter making the receiver busy (e.g., an identifier of the current transmitter). If the potential transmitter knows that it does not interfere too much (e.g., does not interfere above a threshold or threshold amount) with the ongoing transmission, it may still transmit to another station, thus mitigating the exposed node problem.

The BSY signal may contain other information such as, for example, the interference load on the receiving station (e.g., current MCS level, precoder, noise level, interference level, probability of frame decoding) which can be used to indicate if the other ongoing transmission can be cancelled or ignored, e.g., using successive interference calculation or other signal processing approaches. In an embodiment, the BSY signal may contain information that can be used to change the order of contending terminals, e.g., the BSY signal can contain the MAC ID of the terminal that should make its back-off 0 immediately following the end of the current transmission.

Figure 5:
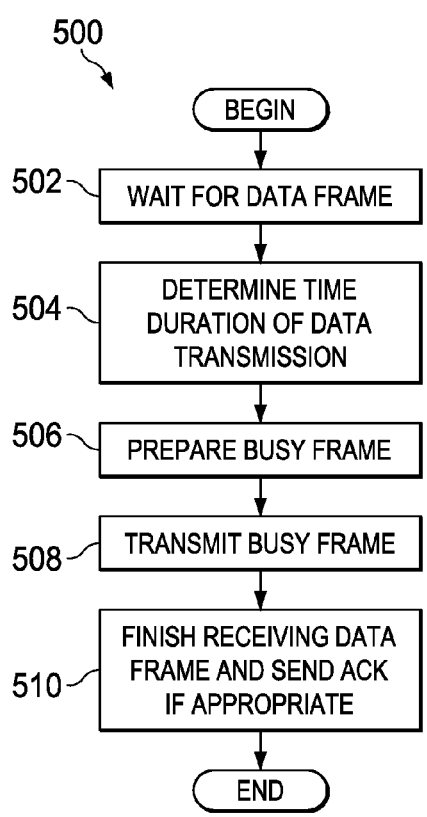
FIG. 5 is a flowchart illustrating an embodiment method in a wireless network component for implementing a virtual busy tone mechanism for virtual carrier sensing systems.

FIG. 5 is a flowchart illustrating an embodiment method 500 in a network component, such as for example, $AP_1$ 402 in FIG. 4, for implementing a virtual busy tone mechanism for virtual carrier sensing systems. The method 500 begins at block 502 where the primary transceiver or network component (e.g., AP) waits for a data frame from a STA. At block 504, the primary transceiver determines the time duration of a data transmission being received from a STA. At block 506, the primary transceiver prepares a BSY frame. The BSY frame includes a time duration for the ongoing transmission from the STA to be complete (including, in some embodiment, the time to transmit an ACK message, i.e., a supplemental time duration). At block 508, the primary transceiver transmits the BSY frame. At block 510, the primary transceiver finishes receiving the data frame from the STA and transmits an ACK message, if appropriate, after which, the method 500 ends.

Figure 6:
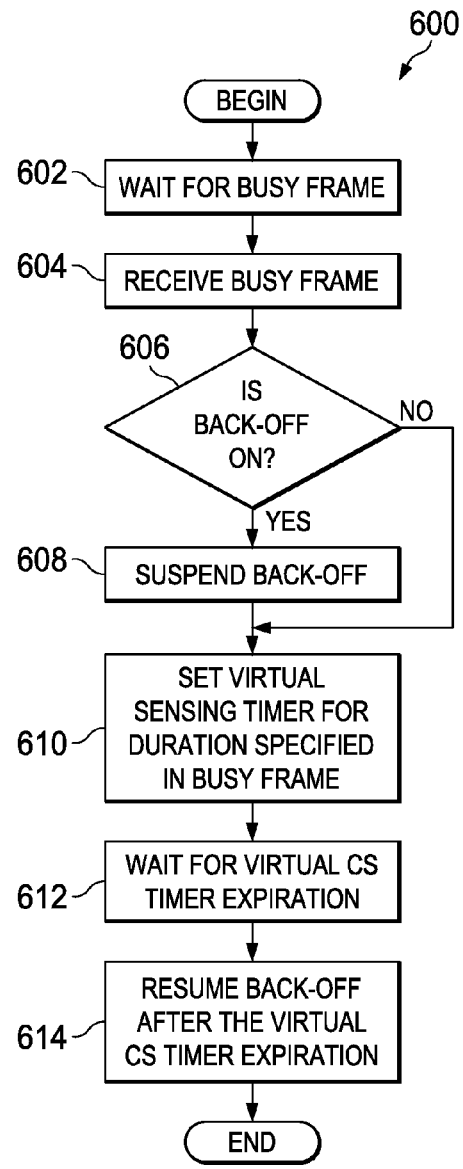
FIG. 6 is a flowchart illustrating an embodiment method in a wireless network component for implementing a virtual busy tone back-off suspension mechanism in a virtual carrier sensing system.

FIG. 6 is a flowchart illustrating an embodiment method 600 in a network component, such as, for example, $STA_2$ 406 in FIG. 4, for implementing a virtual busy tone back-off suspension mechanism in a virtual carrier sensing system. The method 600 begins at block 602 where the secondary transceiver waits for a busy frame from the primary transceiver (e.g., an AP). At block 604, the secondary transceiver receives the busy frame from the primary transceiver and, at block 606, determines whether back-off is on. If the back-off is on, then the method 600 proceeds to block to 608 where the secondary transceiver suspends its back-off mechanism. If, at block 606, the back-off mechanism if off, or after completing the actions in block 608, the method 600 proceeds to block 610 where the secondary receiver sets the virtual carrier sensing (CS) timer for the duration specified in the busy frame. At block 612, the secondary transceiver waits for the virtual CS timer to expire and, at block 614; the secondary receiver resumes the back-off mechanism after the expiration of the virtual CS timer. After resuming back-off in block 614, the method 600 ends.

Figure 7:
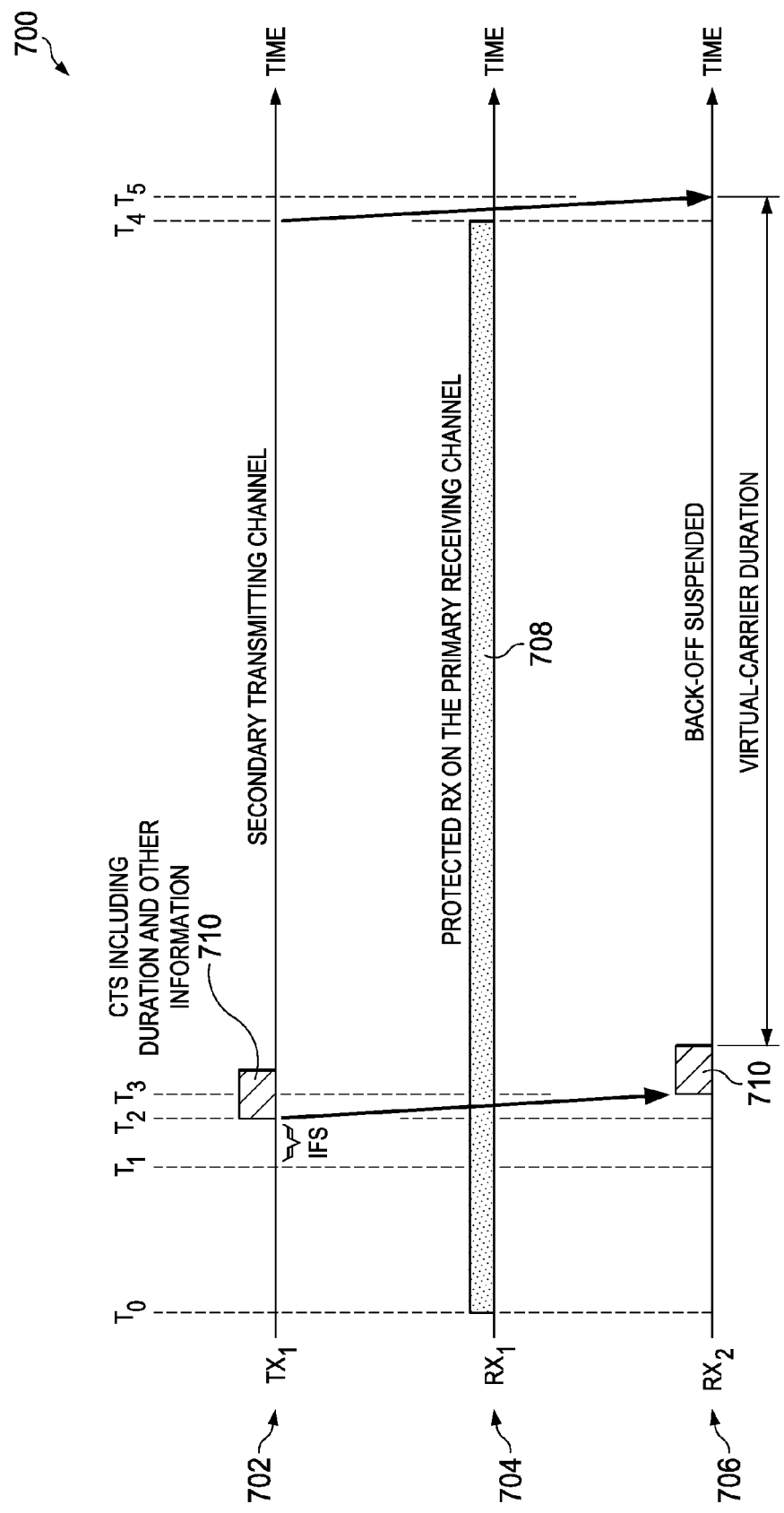
FIG. 7 is a block diagram of an embodiment system for busy-tone implementation with spurious IEEE 802.11 CTS-like frames.

FIG. 7 is a block diagram of an embodiment system 700 for busy-tone implementation with spurious IEEE 802.11 CTS-like frames. $TX_1$ 702 and $RX_1$ 704 are the transmitter and receiver, respectively, of a primary transceiver, e.g., an AP. Upon receiving data on its primary receiving channel $RX_1$ 704, the primary transceiver transmits with its $TX_1$ 702 on the secondary transmitting channel a CTS packet containing the duration of the reception to be protected. It should be noted that to transmit the CTS frame, the parallel secondary transmission channel should be idle unless it supports interruption of ongoing transmission.

Figure 8:
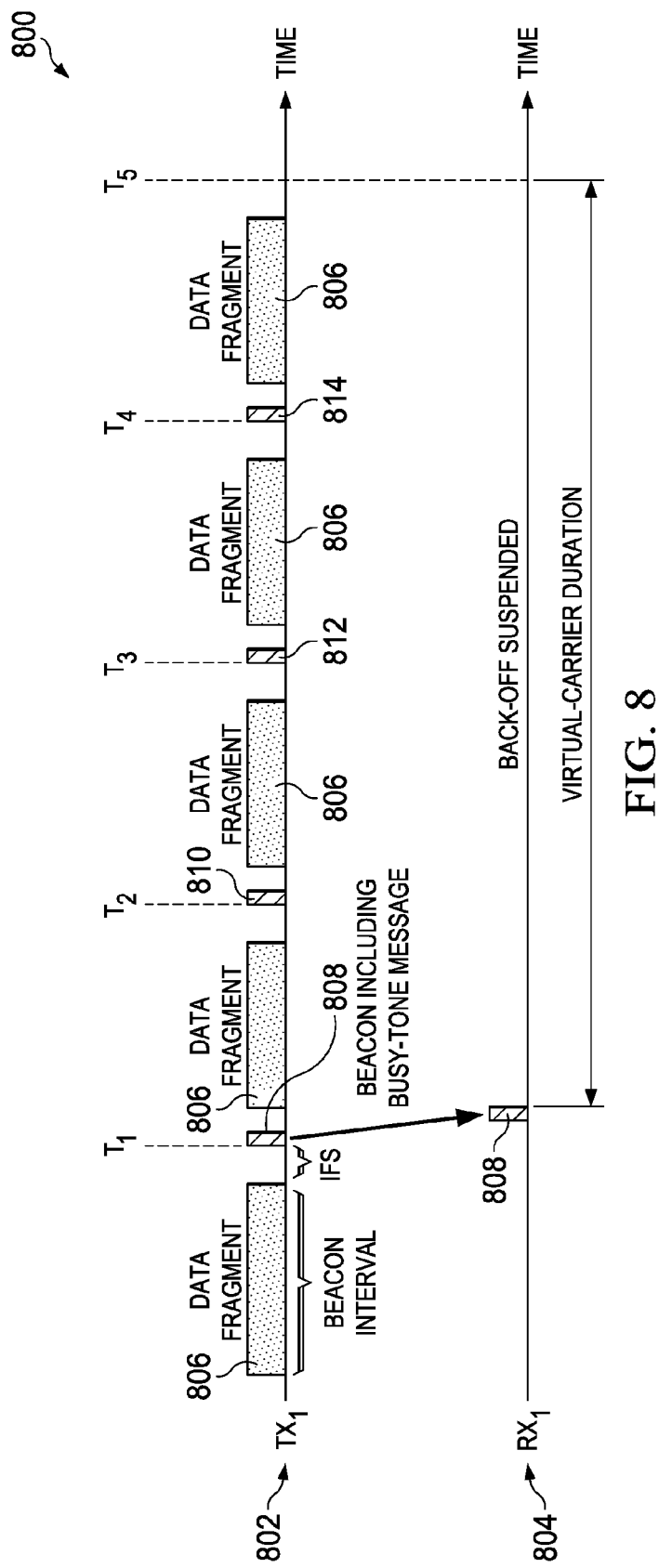
FIG. 8 is a block diagram of an embodiment system for busy tone implementation with beacon frames.

FIG. 8 is a block diagram of an embodiment system 800 for busy tone implementation with beacon frames. The system 800 includes a primary transceiver (e.g., an AP) and a plurality of secondary transceivers (e.g., a plurality of STAs). $TX_1$ 802 is the transmitter of the primary transceiver and $RX_1$ 804 is the receiver of one of the secondary transceivers communicating with the primary transceiver. The primary transceiver begins receiving data from one of the secondary transceivers (not shown) sometime before time $T_1$. The primary transceiver is also transmitting data to another transceiver or station with $TX_1$ 802. The primary transceiver is configured to transmit a beacon 808, 810, 812, 814 at regular intervals at times $T_1, T_2, T_3, T_4$, etc. as shown. In order to transmit the beacons 808, 810, 812, 814, the data transmitted by the primary transceiver is fragmented if the time to transmit the data is longer than the interval between successive beacons 808, 810, 812, 814. Thus, as shown in FIG. 8, the data is separated into a plurality of data fragments 806. In an embodiment, the fragmentation should be done in a uniform manner to ensure that the beacons 808, 810, 812, 814 are transmitted at regular intervals.

The beacon 808 transmitted at time $T_1$ contains a busy-tone that includes the duration to the end of the reception being received by the primary transceiver from a secondary transceiver. Another secondary transceiver receives the busy-tone in the beacon frame and suspends its back-off until time $T_5$—the end of the time duration specified in the beacon 808. Thus, during the time between receiving beacon 808 and time $T_5$, all secondary transceivers other than the one currently sending the ongoing transmission suspend their back-off.

Performance of virtual carrier-sensing depends on the period of the busy-tone. A shorter time period between beacons implies a shorter CS vulnerability period during which collisions are avoided. A tuning management parameter may be used to change the period duration during times of busy network loading conditions versus lightly loaded networks. A shorter beacon period also means more overhead. However, short times between messages may be required by the MAC protocol.

Figure 9:
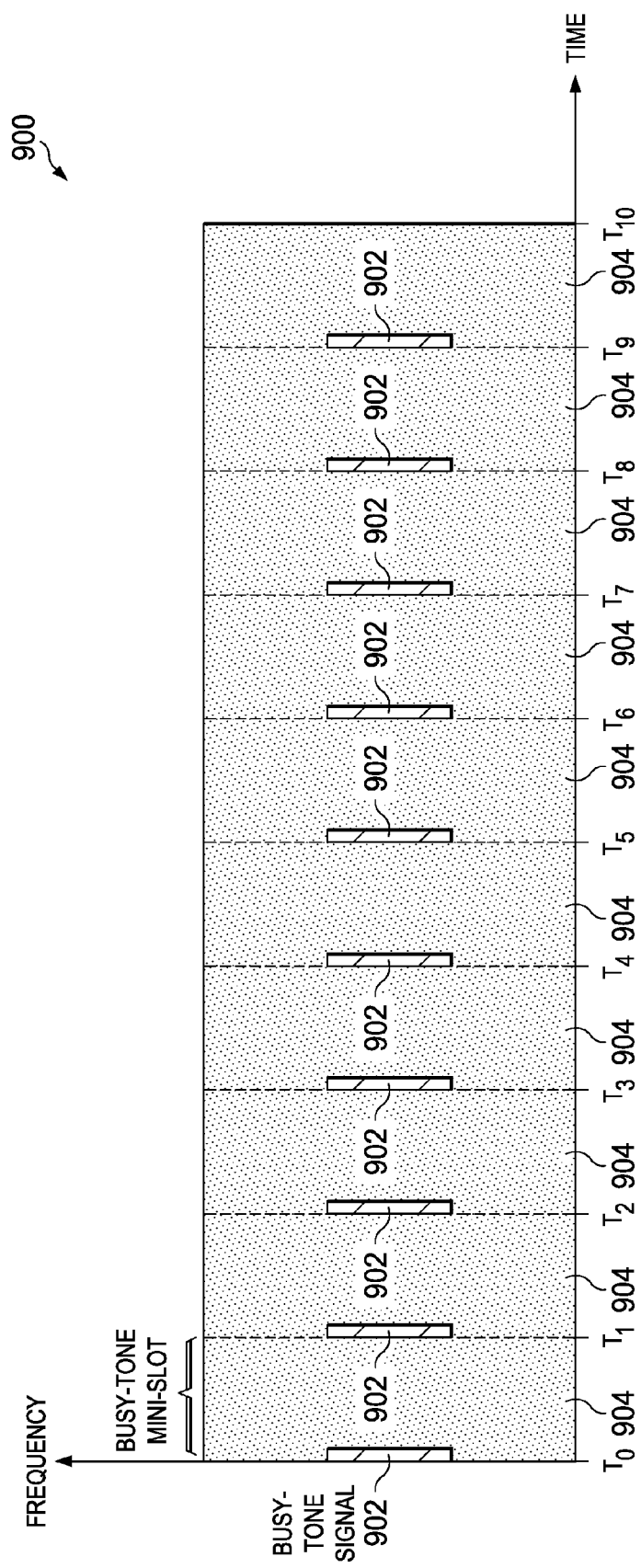
FIG. 9 is a timing diagram illustrating an embodiment system for busy-tone implementation with a PN sequence.

FIG. 9 is a diagram of time versus frequency illustrating an embodiment system 900 for busy-tone implementation with a PN sequence. Blocks 904 are time and frequency blocks for data transmission. The transmitter reserves a resource block 902 where data is not transmitted. The block location of these resource blocks 902 may change in frequency and/or antennas over time. The block duration of these resource blocks 902 may be announced in management beacons. In the resource blocks 902, the transmitter sends a PN code to indicate the left-over time in the currently received transmission. Specific PN codes may be associated with UE IDs, durations, or UE IDS and durations. The performance of virtual CS depends on how close the messages are in time. In an embodiment, the overhead should be smaller than with beacon messages. In an embodiment, busy-tone implementation with a PN sequence is backward compatible with existing 801.11 technologies.

Figure 10:
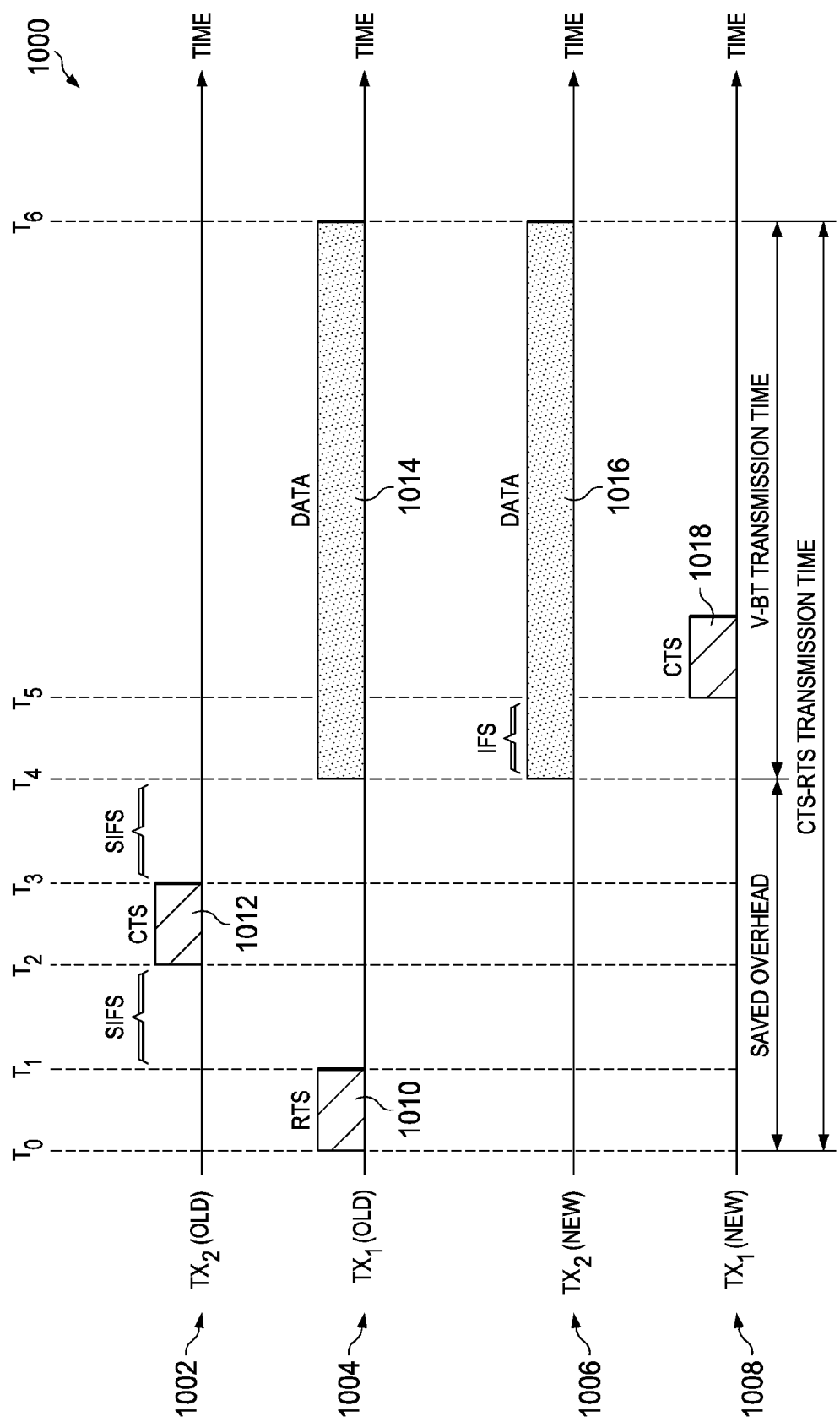
FIG. 10 is a timing diagram comparing the disclosed busy-tone system to the CTS-RTS system.

FIG. 10 is a timing diagram 1000 comparing the disclosed busy-tone system to the CTS-RTS system. In the old CTS-RTS method, the secondary station $TX_1$ (old) 1004 transmits an RTS frame 1010 to the primary station $TX_2$ (old) 1002 (e.g., an AP) at time $T_0$. Transmission of the RTS frame 1010 is completed at time $T_1$. AT time $T_2$, after a short interframe space (SIFS), the primary station $TX_2$ (old) 1002 transmits a CTS frame 1012 back to the secondary station $TX_1$ (old) 1004. The transmission of the CTS frame 1012 is completed at time $T_3$ and at time $T_4$, after another SIFS after time $T_3$, the secondary station $TX_1$ (old) 1004 begins transmitting data 1014 to the primary station $TX_2$ (old) 1002. The time to complete the data transmission for the CTS-RTS method is the time from $T_0$ to $T_6$. The transmission time for sending the data is V-BT transmission time which is the time from $T_4$ to $T_6$.

In the disclosed busy-tone system, a secondary station TX2 (new) 1006 begins transmitting data 1016 at time $T_4$ without sending an RTS and waiting for a CTS from the primary station $TX_1$ (new) 1008. At time $T_5$, after an IFS time period after time $T_4$, the primary station $TX_1$ (new) 1008 transmits a CTS frame 1018 that includes a busy-tone signal or frame. This notifies other stations to suspend their back-off operation until time $T_6$ when the data 1016 transmission from the secondary station $TX_2$ (new) 1006 to the primary station $TX_1$ (new) 1008 is completed. Thus, the total time for transmitting the data 1016 is the time from $T_4$ to $T_6$. The time from $T_0$ to $T_4$ is save overhead that can be used for other data transmission.

Figure 11:
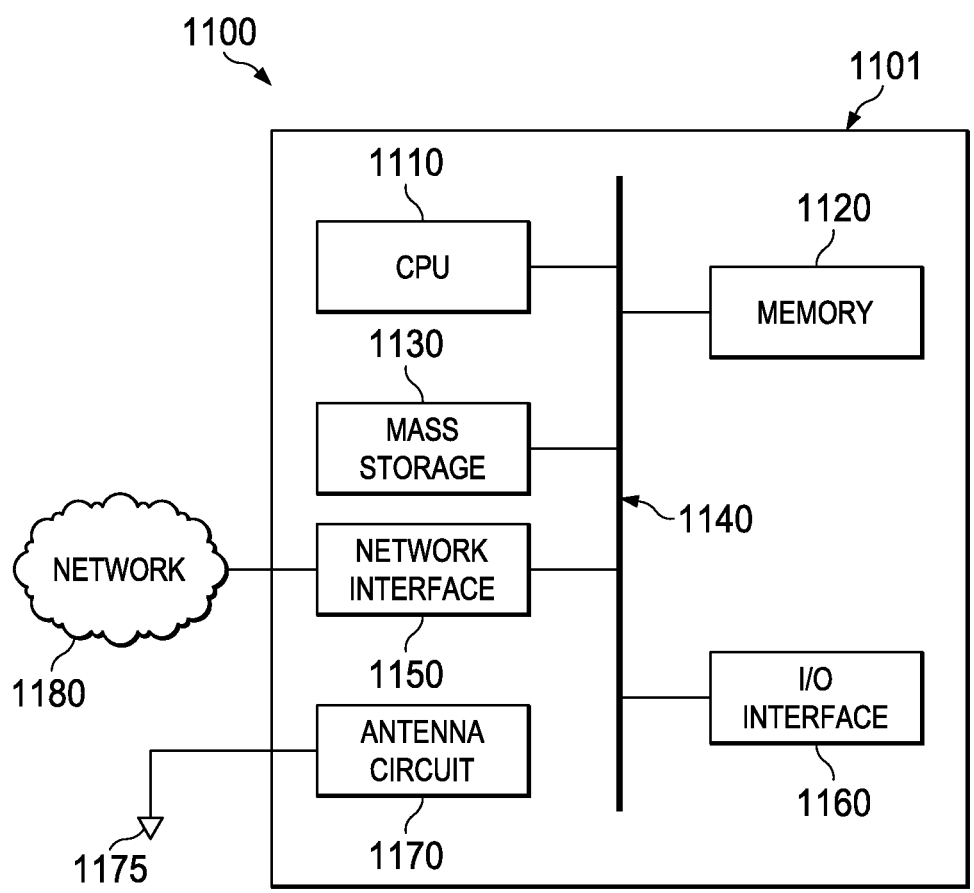
FIG. 11 illustrates a computing platform that may be used for implementing, for example, the devices and methods described herein, in accordance with an embodiment.

FIG. 11 is a block diagram of a processing system 1100 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1100 may comprise a processing unit 1101 equipped with one or more input/output devices, such as a speaker, microphone, mouse, touchscreen, keypad, keyboard, printer, display, and the like. The processing unit 1101 may include a central processing unit (CPU) 1110, memory 1120, a mass storage device 1130, a network interface 1150, an I/O interface 1160, and an antenna circuit 1170 connected to a bus 1140. The processing unit 1101 also includes an antenna element 1175 connected to the antenna circuit.

The bus 1140 may be one or more of any type of several bus architectures including a memory bus or memory controller, a peripheral bus, video bus, or the like. The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs.

The mass storage device 1130 may comprise any type of storage device configured to store data, programs, and other information and to make the data, programs, and other information accessible via the bus 1140. The mass storage device 1130 may comprise, for example, one or more of a solid state drive, hard disk drive, a magnetic disk drive, an optical disk drive, or the like.

The I/O interface 1160 may provide interfaces to couple external input and output devices to the processing unit 1101. The I/O interface 1160 may include a video adapter. Examples of input and output devices may include a display coupled to the video adapter and a mouse/keyboard/printer coupled to the I/O interface. Other devices may be coupled to the processing unit 1101 and additional or fewer interface cards may be utilized. For example, a serial interface such as Universal Serial Bus (USB) (not shown) may be used to provide an interface for a printer.

The antenna circuit 1170 and antenna element 1175 may allow the processing unit 1101 to communicate with remote units via a network. In an embodiment, the antenna circuit 1170 and antenna element 1175 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 1170 and antenna element 1175 may also provide Bluetooth and/or WiFi connection to other devices.

The processing unit 1101 may also include one or more network interfaces 1150, which may comprise wired links, such as an Ethernet cable or the like, and/or wireless links to access nodes or different networks. The network interface 1101 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a full-duplex enabled wireless network component for avoiding collisions, the method comprising:
   receiving, at the network component, a data transmission from a first station; and
   transmitting, by the network component, a busy indicator from the network component, the busy indicator including a time duration determined in accordance with an expected time duration of the data transmission to instruct any non-transmitting station to not transmit data during the included time duration,
   wherein the expected time duration is obtained from an Modulation and Coding Scheme (MCS) selection and frame length in the data transmission.

2. The method of claim 1, wherein transmitting the busy indicator comprises broadcasting the busy indicator from the network component.

3. The method of claim 1, wherein the time duration is substantially equal to the expected time duration.

4. The method of claim 1, wherein the time duration comprises the expected time duration plus a supplemental time duration for completing a task after receipt of the data transmission.

5. The method of claim 4, wherein the task comprises transmitting an acknowledgement message to the first station.

6. The method of claim 1, wherein the busy indicator comprises a busy frame.

7. The method of claim 6, wherein the busy frame comprises a control frame.

8. The method of claim 6, wherein the busy frame comprises an identifier of the first station and an identifier of the network component.

9. The method of claim 8, wherein the identifier of the first station comprises a first media access control (MAC) address and wherein the identifier of the network component comprises a second MAC address.

10. The method of claim 1, wherein the busy indicator is transmitted as part of a beacon message.

11. The method of claim 1, wherein the busy indicator comprises a physical layer signal.

12. The method of claim 11, wherein the physical layer signal comprises a low power pseudo-noise (PN) code.

13. The method of claim 1, wherein the data transmission comprises a data frame and the expected time duration is obtained from a duration field in the data frame.

14. The method of claim 1, wherein the busy indicator comprises information to notify at least one non-transmitting station whether the non-transmitting station can ignore the busy indicator and transmit during the time duration without interfering with reception of the data transmission by the network component by more than a threshold amount.

15. The method of claim 1, further comprising broadcasting a channel available indicator to the non-transmitting stations after the data transmission is complete to indicate that a channel is available for other stations to use.

16. A network component configured for full-duplex wireless operation for avoiding collisions, the network component comprising:
   a processor; and
   a non-transitory computer readable storage medium storing programming for execution by the processor, the programming including instructions to cause the network component to:
   receive a data transmission from a first station; and
   transmit a busy indicator from the network component, the busy indicator including a time duration determined in accordance with an expected time duration of the data transmission to instruct any non-transmitting station to not transmit data during the included time duration,
   wherein the expected time duration is obtained from an Modulation and Coding Scheme (MCS) selection and frame length in the data transmission.

17. The network component of claim 16, wherein the instructions to cause the network component to transmit the busy indicator comprises instructions to cause the network component to broadcast the busy indicator from the network component.

18. The network component of claim 16, wherein the time duration is substantially equal to the expected time duration.

19. The network component of claim 16, wherein the time duration comprises the expected time duration plus a supplemental time duration for completing a task after receipt of the data transmission.

20. The network component of claim 19, wherein the task comprises transmitting an acknowledgement message to the first station.

21. The network component of claim 16, wherein the busy indicator comprises a busy frame.

22. The network component of claim 21, wherein the busy frame comprises a control frame.

23. The network component of claim 21, wherein the busy frame comprises an identifier of the first station and an identifier of the network component.

24. The network component of claim 23, wherein the identifier of the first station comprises a first media access control (MAC) address and wherein the identifier of the network component comprises a second MAC address.

25. The network component of claim 16, wherein the busy indicator is transmitted as part of a beacon message.

26. The network component of claim 16, wherein the busy indicator comprises a physical layer signal.

27. The network component of claim 26, wherein the physical layer signal comprises a low power pseudo-noise (PN) code.

28. The network component of claim 16, wherein the data transmission comprises a data frame and the expected time duration is obtained from a duration field in the data frame.

29. The network component of claim 16, wherein the busy indicator comprises information to notify at least one non-transmitting station whether the non-transmitting station can ignore the busy indicator and transmit during the time duration without interfering with reception of the data transmission by the network component by more than a threshold amount.

30. The network component of claim 16, wherein the programming further comprises instructions to cause the network component to broadcast a channel available indicator to the non-transmitting stations after the data transmission is complete to indicate that a channel is available for other stations to use.

31. A method in a wireless network component for suspending transmissions to avoid collisions, the method comprising:
   receiving, by the network component, a busy indicator from a first wireless device, wherein the busy indicator comprises a time duration;
   determining, by the network component, a time duration according to the busy indicator;
   suspending, by the network component, transmissions to the first wireless device until an expiration of the time duration;
   determining that transmission to a second wireless device is possible without causing interference above a threshold for the first wireless device; and
   transmitting data to the second wireless device during the time duration indicated by the busy indicator,
   wherein the busy indicator comprises at least one of a current Modulation and Coding Scheme (MCS) level, a precoder, a noise level, an interference level, and a probability of frame decoding for the first wireless device.

32. The method of claim 31, wherein suspending transmissions comprises suspending a back-off procedure.

33. The method of claim 32, wherein the network component maintains a separate back-off for each of a plurality of potential transmitters.

34. The method of claim 31, wherein the busy indicator comprises an interference load on the first wireless device.

35. A network component for suspending transmissions to avoid collisions, the network component comprising:
   a processor; and
   a non-transitory computer readable storage medium storing programming for execution by the processor, the programming including instructions to cause the network component to:
   receive a busy indicator from a first wireless device, wherein the busy indicator comprises a time duration;
   determine a time duration according to the busy indicator;
   suspend transmissions to the first wireless device until an expiration of the time duration;
   determine that transmission to a second wireless device is possible without causing interference above a threshold for the first wireless device; and
   transmit data to the second wireless device during the time duration indicated by the busy indicator,
   wherein the busy indicator comprises at least one of a current Modulation and Coding Scheme (MCS) level, a precoder, a noise level, an interference level, and a probability of frame decoding for the first wireless device.

36. The network component of claim 35, wherein suspending transmissions comprises suspending a back-off procedure.

37. The network component of claim 36, wherein the network component maintains a separate back-off for each of a plurality of potential transmitters.

38. The network component of claim 35, wherein the busy indicator comprises an interference load on the first wireless device.

* * * * *